United States Patent
Abotabl et al.

(10) Patent No.: US 12,349,112 B2
(45) Date of Patent: Jul. 1, 2025

(54) FLEXIBLE BANDWIDTH PART FREQUENCY OFFSET CONFIGURATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 763 days.

(21) Appl. No.: 17/454,943

(22) Filed: Nov. 15, 2021

(65) Prior Publication Data

US 2023/0156672 A1    May 18, 2023

(51) Int. Cl.
*H04W 72/04* (2023.01)
*H04L 5/00* (2006.01)
*H04L 5/14* (2006.01)
*H04W 72/044* (2023.01)

(52) U.S. Cl.
CPC ......... *H04W 72/044* (2013.01); *H04L 5/0005* (2013.01); *H04L 5/0078* (2013.01); *H04L 5/0092* (2013.01); *H04L 5/14* (2013.01)

(58) Field of Classification Search
CPC ........... H04W 72/044; H04W 72/0453; H04W 72/20; H04W 72/0446; H04L 5/0044; H04L 5/0078; H04L 5/0092; H04L 5/14; H04L 27/2602; H04L 5/0005; H04L 5/001; H04L 5/0051; H04L 1/1825; H04L 5/0094
See application file for complete search history.

(56) References Cited

U.S. PATENT DOCUMENTS

| | | | | |
|---|---|---|---|---|
| 2019/0373667 | A1* | 12/2019 | Jeon | H04L 5/001 |
| 2020/0314845 | A1* | 10/2020 | Miao | H04W 72/20 |
| 2022/0086911 | A1* | 3/2022 | Oh | H04W 74/006 |
| 2022/0312342 | A1* | 9/2022 | Cha | H04L 5/0051 |
| 2023/0337023 | A1* | 10/2023 | Li | H04W 72/0446 |
| 2024/0032055 | A1* | 1/2024 | Xiong | H04L 1/1825 |

FOREIGN PATENT DOCUMENTS

| | | | | |
|---|---|---|---|---|
| WO | WO-2023055631 A1 * | 4/2023 | | |
| WO | WO-2023081133 A1 * | 5/2023 | | H04L 5/005 |

OTHER PUBLICATIONS

International Search Report and Written Opinion—PCT/US2022/079834—ISA/EPO—Mar. 15, 2023.
(Continued)

*Primary Examiner* — Vinncelas Louis
(74) *Attorney, Agent, or Firm* — Paul M. McAdams; Harrity & Harrity, LLP

(57) ABSTRACT

Various aspects generally relate to wireless communication. In some aspects, a network node may receive signaling identifying a configuration for a first bandwidth part, wherein the configuration for the first bandwidth part includes a first central frequency for the first bandwidth part. The network node may communicate using a second bandwidth part associated with a second central frequency that is offset from the first central frequency by a configured offset. Numerous other aspects are described.

30 Claims, 9 Drawing Sheets

(56) References Cited

OTHER PUBLICATIONS

Panasonic: "Aspects Related to Reduced Maximum UE Bandwidth for Redcap", 3GPP TSG RAN WG1 #107-e, R1-2112084, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 5, 2021, 7 Pages, XP052179553, Sections 2.2-2.3.

Samsung: "Flexible BW Supports in NR", 3GPP TSG-RAN WG2 NR #98 Meeting, R2-1704501, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 4, 2017, 6 Pages, XP051263604, Section 2.1.

Samsung: "Moderator's Summary for Discussion [RAN93e-R18Prep-11] Evolution of Duplex Operation", 3GPP TSG RAN#93e, RP-211661, 3rd Generation Partnership Project (3GPP), Mobile Competence Centre, 650, Route Des Lucioles, F-06921 Sophia-Antipolis Cedex, France, vol. RAN WG3, No. Electronic Meeting, Sep. 13, 2021-Sep. 17, 2021, Sep. 6, 2021, pp. 1-49, XP052049062, The Whole Document.

Softbank Corp: "On Prerequisites and Requirements for Different CBWs in BS and UE", 3GPP TSG RAN WG4 Meeting #88bis, R4-1812411, 3rd Generation Partnership Project (3GPP), Mobile Competence Centre, 650, Route Des Lucioles, F-06921 Sophia-Antipolis Cedex, France, vol. RAN WG4, No. Chungdu, China, Oct. 8, 2018-Oct. 12, 2018, Sep. 28, 2018, pp. 1-5, XP051581146, Section 2.2.

Spreadtrum Communications: "Email Discussion Summary for RAN-R18-WS-eMBB-Spreadtrum Communications", 3GPP TSG RAN Rel-18 Workshop, RWS-210545, 3rd Generation Partnership Project (3GPP), Mobile Competence Centre, 650, Route Des Lucioles, F-06921 Sophia-Antipolis Cedex, France, vol. RAN WG3, No. Electronic Meeting, Jun. 28, 2021-Jul. 2, 2021, Jun. 25, 2021, pp. 1-14, XP052029018, The Whole Document.

* cited by examiner

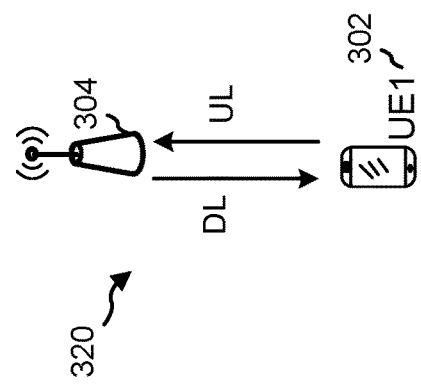
FIG. 3B
FIG. 3C
FIG. 3A

FLEXIBLE BANDWIDTH PART FREQUENCY OFFSET CONFIGURATION

FIELD OF THE DISCLOSURE

Aspects of the present disclosure generally relate to wireless communication and to techniques and apparatuses for flexible bandwidth part frequency offset configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving, by the network node, signaling identifying a configuration for a first bandwidth part, wherein the configuration for the first bandwidth part comprises a first central frequency for the first bandwidth part. The method may include communicating, by the network node, using a second bandwidth part associated with a second central frequency that is offset from the first central frequency by a configured offset.

Some aspects described herein relate to a method of wireless communication performed by a network node. The method may include transmitting, by the network node, signaling identifying a configuration for a first bandwidth part, wherein the configuration for the first bandwidth part comprises a first central frequency for the first bandwidth part. The method may include communicating, by the network node, using a second bandwidth part associated with a second central frequency that is offset from the first central frequency by a configured offset.

Some aspects described herein relate to a network node for wireless communication. The network node may include a memory and one or more processors coupled to the memory. The one or more processors may be configured to receive signaling identifying a configuration for a first bandwidth part, wherein the configuration for the first bandwidth part comprises a first central frequency for the first bandwidth part. The one or more processors may be configured to communicate using a second bandwidth part associated with a second central frequency that is offset from the first central frequency by a configured offset.

Some aspects described herein relate to a network node for wireless communication. The network node may include a memory and one or more processors coupled to the memory. The one or more processors may be configured to transmit signaling identifying a configuration for a first bandwidth part, wherein the configuration for the first bandwidth part comprises a first central frequency for the first bandwidth part. The one or more processors may be configured to communicate using a second bandwidth part associated with a second central frequency that is offset from the first central frequency by a configured offset.

Some aspects described herein relate to a non-transitory computer-readable medium that stores a set of instructions for wireless communication by a network node. The set of instructions, when executed by one or more processors of the network node, may cause the network node to receive signaling identifying a configuration for a first bandwidth part, wherein the configuration for the first bandwidth part comprises a first central frequency for the first bandwidth part. The set of instructions, when executed by one or more processors of the network node, may cause the network node to communicate using a second bandwidth part associated with a second central frequency that is offset from the first central frequency by a configured offset.

Some aspects described herein relate to a non-transitory computer-readable medium that stores a set of instructions for wireless communication by a network node. The set of instructions, when executed by one or more processors of the network node, may cause the network node to transmit signaling identifying a configuration for a first bandwidth part, wherein the configuration for the first bandwidth part comprises a first central frequency for the first bandwidth part. The set of instructions, when executed by one or more processors of the network node, may cause the network node to communicate using a second bandwidth part associated with a second central frequency that is offset from the first central frequency by a configured offset.

Some aspects described herein relate to an apparatus for wireless communication. The apparatus may include means for receiving signaling identifying a configuration for a first bandwidth part, wherein the configuration for the first bandwidth part comprises a first central frequency for the first bandwidth part. The apparatus may include means for communicating using a second bandwidth part associated with a second central frequency that is offset from the first central frequency by a configured offset.

Some aspects described herein relate to an apparatus for wireless communication. The apparatus may include means for transmitting signaling identifying a configuration for a first bandwidth part, wherein the configuration for the first bandwidth part comprises a first central frequency for the first bandwidth part. The apparatus may include means for communicating using a second bandwidth part associated with a second central frequency that is offset from the first central frequency by a configured offset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing broadly outlines example features and example technical advantages of examples according to the disclosure. Additional example features and example advantages are described herein.

BRIEF DESCRIPTION OF THE DRAWINGS

The drawings illustrate certain example aspects of this disclosure and are therefore not limiting in scope. The same reference numbers in different drawings may identify the same or similar elements.

FIGS. 3A-3C are diagrams illustrating examples of full duplex (FD) communication, in accordance with the present disclosure.

DETAILED DESCRIPTION

Figure 1:
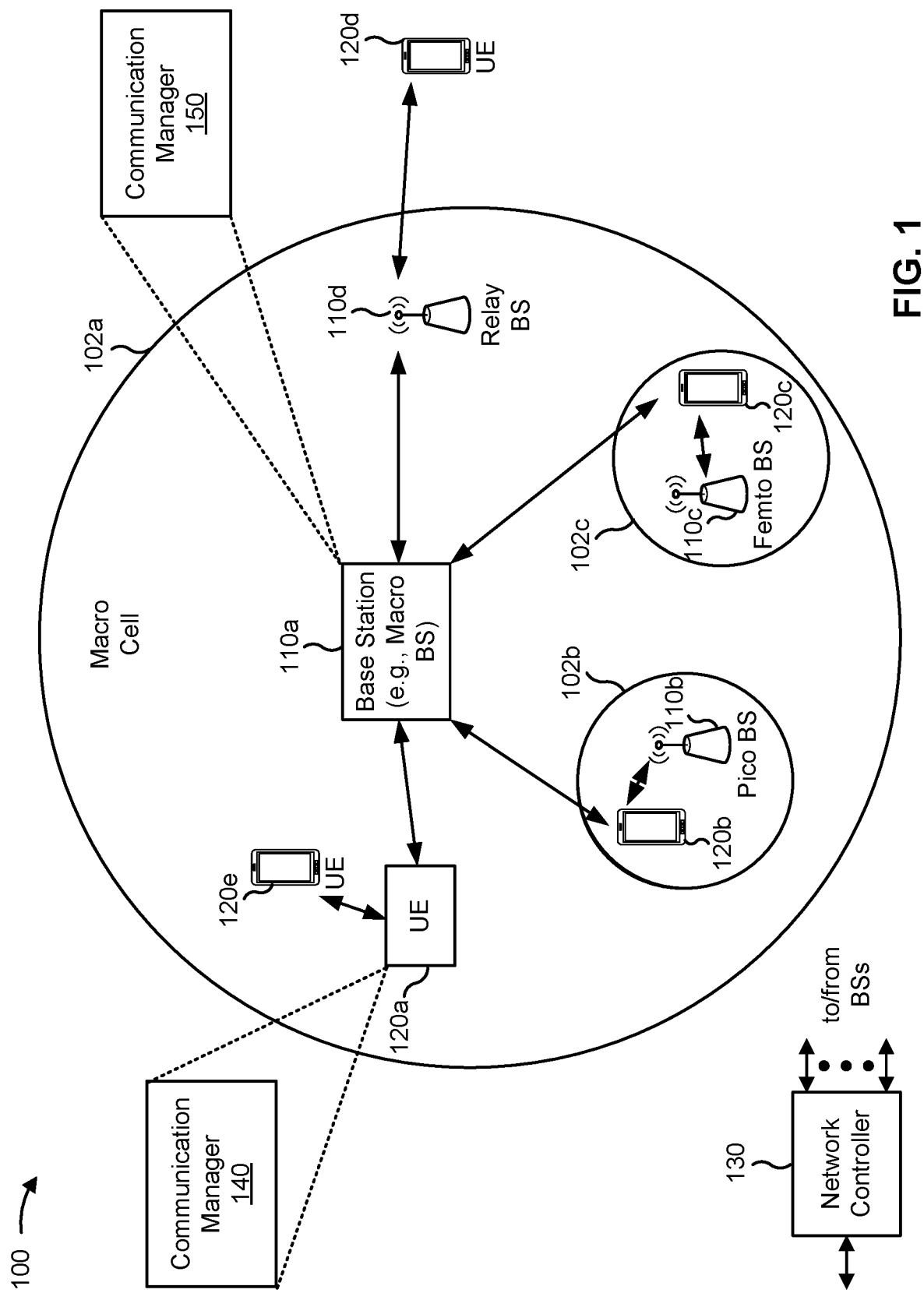
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

This disclosure may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a base station (BS)) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the UE 120) may include a communication manager 140. As described in more detail elsewhere herein, the communication manager 140 may receive signaling identifying a configuration for a first bandwidth part, wherein the configuration for the first bandwidth part comprises a first central frequency for the first bandwidth part; and communicate using a second bandwidth part associated with a second central frequency that is offset from the first central frequency by a configured offset. Additionally, or alternatively, the communication manager 140 may perform one or more other operations described herein.

In some aspects, a network node (e.g., the base station 110) may include a communication manager 150. As described in more detail elsewhere herein, the communication manager 150 may transmit signaling identifying a configuration for a first bandwidth part, wherein the configuration for the first bandwidth part comprises a first central frequency for the first bandwidth part; and communicate using a second bandwidth part associated with a second central frequency that is offset from the first central frequency by a configured offset. Additionally, or alternatively, the communication manager 150 may perform one or more other operations described herein.

As used herein, a network node may refer to any UE, base station, apparatus, device, or computing system configured to perform any techniques described herein. For example, a network node may be a UE. As another example, a network node may be a base station. As another example, a first network node may be configured to communicate with a second network node or a third network node. In one aspect of this example, the first network node may be a UE and the second network node may be a base station. Similarly, a third network node may be a UE, a base station, or another device. In some aspects of this example, first, second, and third network nodes may be the same type of device or different types of devices. Similarly, reference to a UE, base station, apparatus, device, or computing system may include disclosure of the UE, base station, apparatus, device, or computing system being a network node. For example, disclosure that a UE is configured to receive information from a base station also discloses that a first network node is configured to receive information from a second network node. In this example, consistent with this disclosure, the first network node may refer to a first UE, a first base station, a first apparatus, a first device, or a first computing system configured to receive the information; and the second network node may refer to a second UE, a second base station, a second apparatus, a second device, or a second computing system.

As indicated above, FIG. 1 is provided as an example. Other examples may differ from what is described with regard to FIG. 1.

Figure 2:
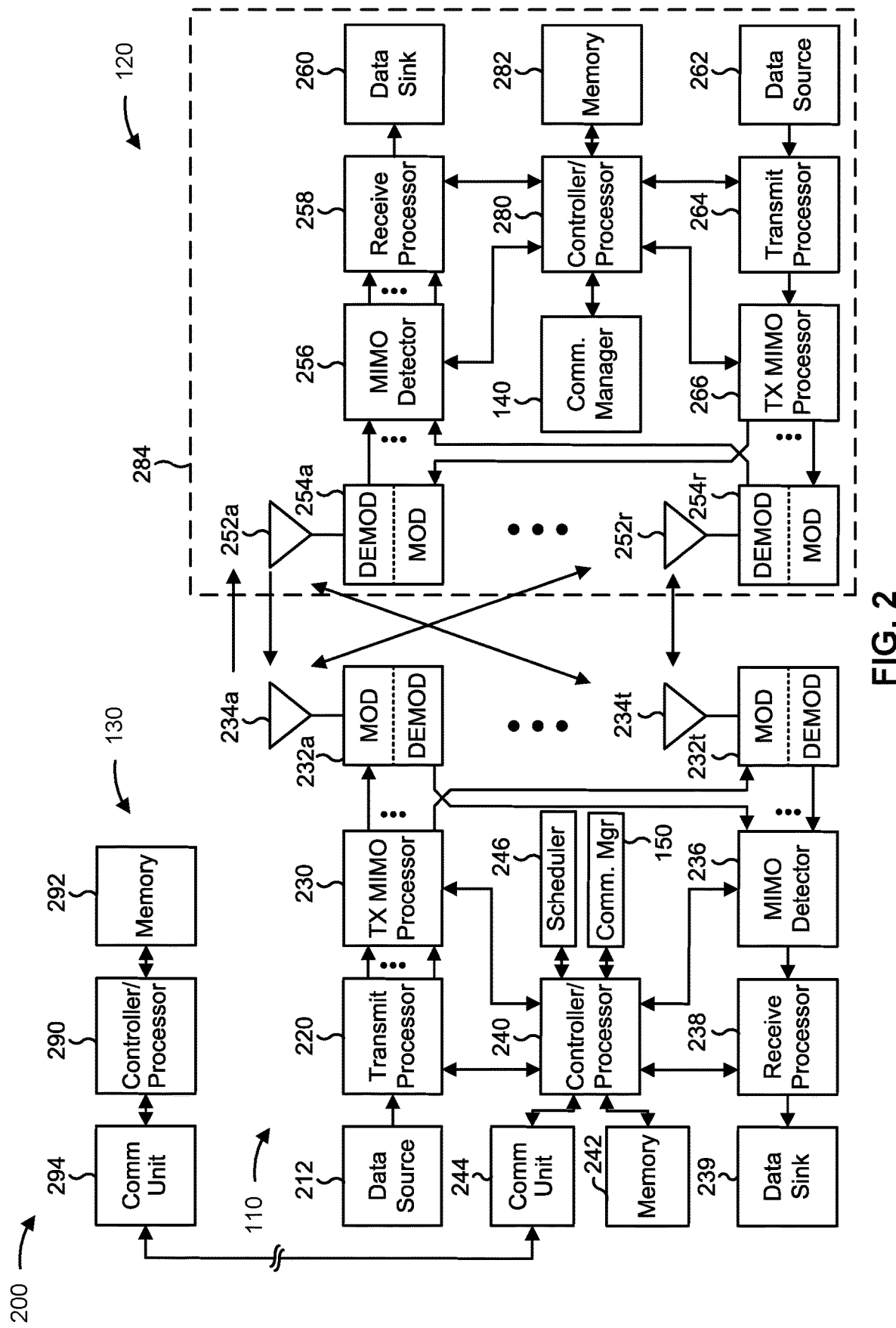
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended or otherwise destined for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with flexible bandwidth prat frequency offset configuration, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a network node (e.g., the UE 120) includes means for receiving signaling identifying a configuration for a first bandwidth part, wherein the configuration for the first bandwidth part comprises a first central frequency for the first bandwidth part; and/or means for communicating using a second bandwidth part associated with a second central frequency that is offset from the first central frequency by a configured offset. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the base station 110) includes means for transmitting signaling identifying a configuration for a first bandwidth part, wherein the configuration for the first bandwidth part comprises a first central frequency for the first bandwidth part; and/or means for communicating using a second bandwidth part associated with a second central frequency that is offset from the first central frequency by a configured offset. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. The example 300 of FIG. 3A includes a UE1 302 and two base stations (e.g., TRPs) 304-1, 304-2, where the UE1 302 is sending uplink (UL) transmissions to base station 304-1 and is receiving downlink (DL) transmissions from base station 304-2. In the example 300 of FIG. 3A, FD is enabled for the UE1 302, but not for the base stations 304-1, 304-2. The example 310 of FIG. 3B includes two UEs, shown as UE1 302-1 and UE2 302-2, and a base station 304, where the UE1 302-1 is receiving a DL transmission from the base station 304 and the UE2 302-2 is transmitting an UL transmission to the base station 304. In the example 310 of FIG. 3B, FD is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting an UL transmission to the base station 304. In the example 320 of FIG. 3C, FD is enabled for both the UE1 302 and the base station 304.

As indicated above, FIGS. 3A-3C are provided as one or more examples. Other examples may differ from what is described with regard to FIGS. 3A-3C.

Figure 4:
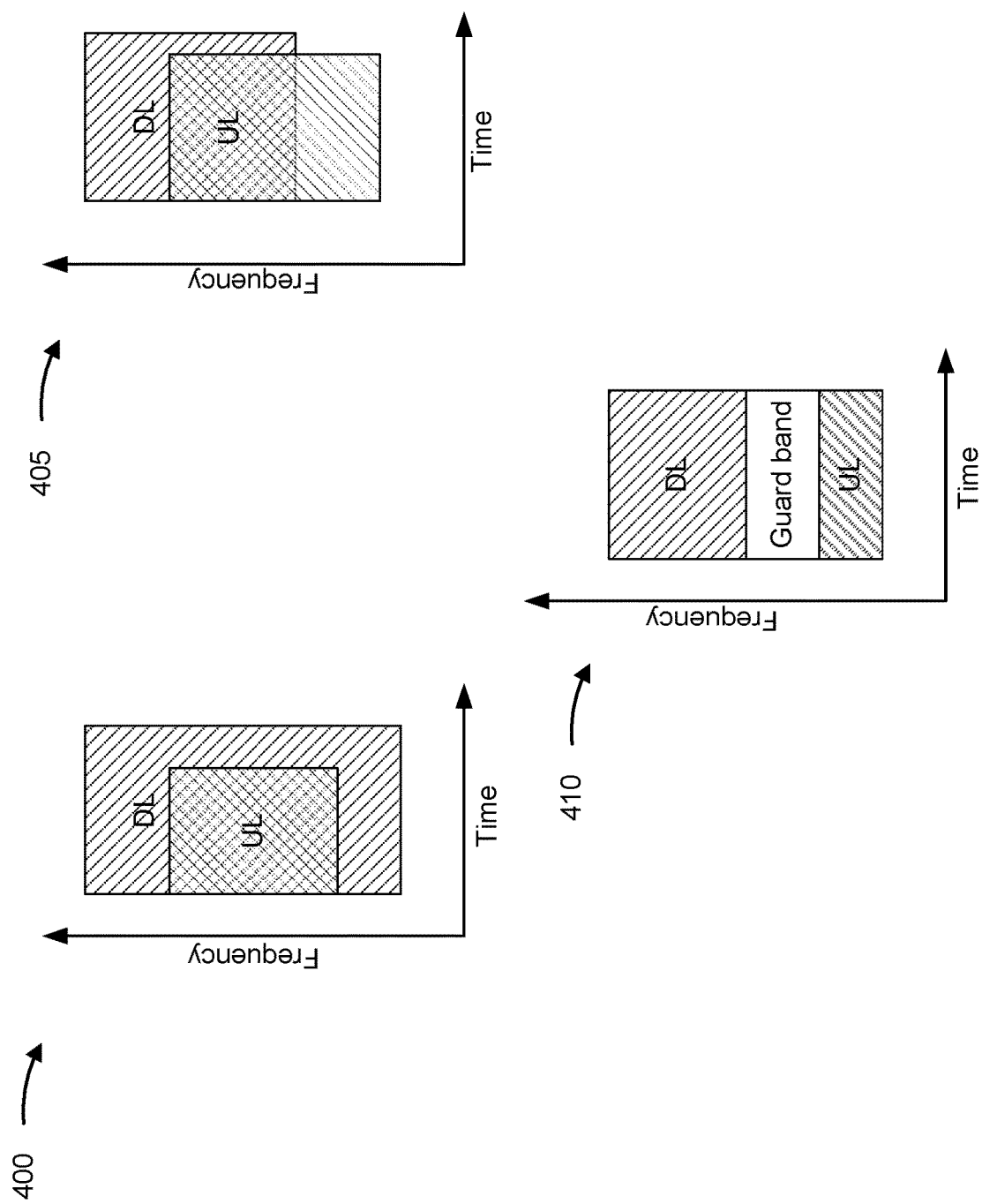
FIG. 4 is a diagram illustrating an example of FD communication in a wireless network, in accordance with the present disclosure.

FIG. 4 is a diagram illustrating examples 400, 405, and 410 of FD communication in a wireless network, in accordance with the present disclosure. FD communication in a wireless network refers to simultaneous bi-directional communication between devices in the wireless network. For example, a UE operating in a full-duplex mode may transmit uplink communications and receive downlink communications at the same time (e.g., in the same slot). In contrast, half-duplex (HD) communication in a wireless network refers to unidirectional communications (e.g., downlink or uplink communication) between devices at a given time (e.g., in a given slot).

As shown in FIG. 4, examples 400 and 405 show examples of in-band full-duplex (IBFD) communication. In IBFD, a UE may transmit uplink communications to a base station and receive downlink communications from the base station on the same time and frequency resources. As shown in example 400, in IBFD, the time and frequency resources for uplink communication may fully overlap with the time and frequency resources for downlink communication. Hence, as illustrated in example 400, in the box labeled UL (uplink), both uplink and downlink communications may be performed simultaneously. As shown in example 405, in IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "flexible duplex." In SBFD, a UE may transmit uplink communications to a base station and receive downlink communications from the base station at the same time, but on different frequency resources (within the same band). For example, the different frequency resources may be sub-bands of a frequency band such as a time division duplexing (TDD) band or a frequency division duplexing (FDD). In this case, the downlink resource may be separated from the uplink resource, in the frequency domain, by a guard band.

As indicated above, FIG. 4 is provided as an example. Other examples may differ from what is described with respect to FIG. 4.

A bandwidth or carrier that a base station and a UE (which may also be referred to as a "mobile station" or a "first network node") use to communicate may be divided into a plurality of bandwidth parts (BWPs). Each BWP may support communication for a service on the carrier. For example, a first BWP may support enhanced mobile broadband (eMBB) service and a second BWP may support ultra-reliable low-latency communication (URLLC) service. A BWP is a contiguous (or in some proposed cases, non-contiguous) set of physical resource blocks (PRBs) that have a common configuration for supporting the service assigned to the BWP. A BWP may be defined in terms of a central frequency or resource element and a bandwidth of the BWP.

Some communications systems may support flexible BWP configuration. In flexible BWP configuration, different BWPs may be configured with different TDD patterns to enable FD communication between a UE and a base station. For example, a first BWP may be configured with a first TDD pattern and a second BWP may be configured with a second TDD pattern, which may enable support for IBFD or SBFD operation. In flexible BWP operation with FD operation, using a central frequency and a bandwidth to define a BWP, as described above, results in downlink resources and uplink resources having the same central frequency and bandwidth. However, in some cases, a level of traffic for a downlink may be different than a level of traffic for an uplink. As a result, defining a BWP for FD operation with the same quantity of downlink resources and uplink resources may result in insufficient resources on a downlink or uplink or result in excess resources on a downlink or uplink. Configuring insufficient resources or excess resources is an inefficient allocation of network resources, which may result in poor network performance on the BWP (when insufficient network resources are allocated) or on other BWPs (when excess network resources are allocated, and insufficient network resources remain available for other BWPs).

Some aspects described herein enable flexible BWP-specific configuration. For example, a base station may configure a UE (e.g., a network node) with a frequency offset value to enable the UE to derive differing resource allocations for an uplink and a downlink on a flexible BWP. In other words, the base station may identify the central frequency and the bandwidth, which may be applicable to one of a downlink or an uplink, and may identify an offset, which may be applicable to the other of the downlink or the uplink. The UE may use the offset to shift the central frequency and expand or contract the bandwidth for the other of the downlink or the uplink. In this way, the base station and the UE can achieve differentiated uplink resource allocations and downlink resource allocations, thereby avoiding an insufficient or excessive allocation of resources for a BWP. By avoiding the insufficient or excessive allocation of resources, the base station and the UE improve network performance.

Figure 5:
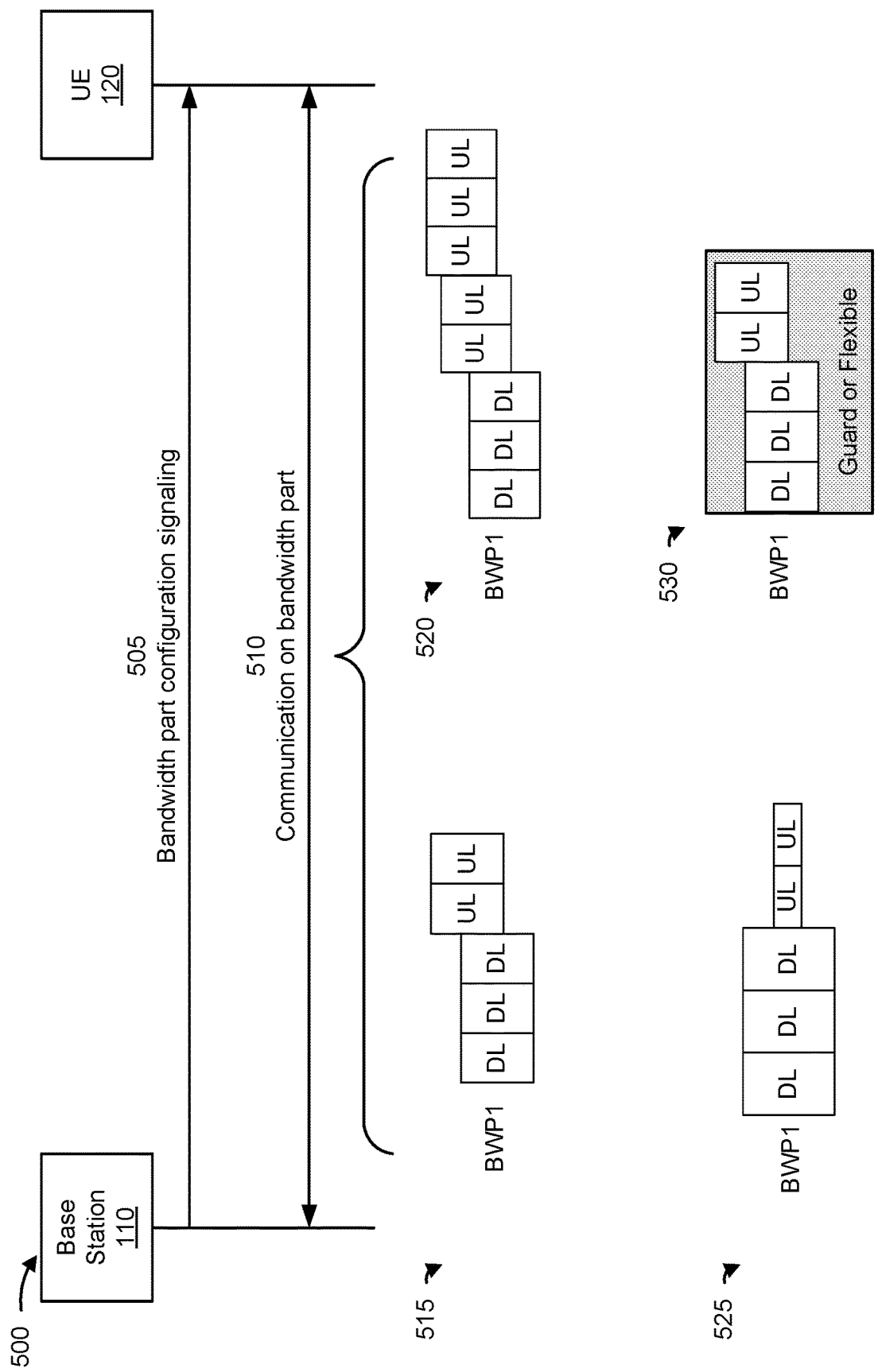
FIG. 5 is a diagram illustrating an example associated with flexible bandwidth part frequency offset configuration, in accordance with the present disclosure.

FIG. 5 is a diagram illustrating an example 500 associated with flexible bandwidth part frequency offset configuration, in accordance with the present disclosure. As shown in FIG. 5, example 500 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 5, and by reference number 505, UE 120 may receive bandwidth part configuration signaling from base station 110. For example, UE 120 may receive information identifying a central frequency for a bandwidth part, a bandwidth for the bandwidth part, or a configured offset for the bandwidth part, among other examples. UE 120 may determine a configuration for an uplink on the bandwidth part and for a downlink on the bandwidth part, and UE 120 may communicate with base station 110 on the uplink and the downlink in accordance with the configuration, as shown by reference number 510. In some aspects, UE 120 may receive information configuring a switching time associated with the bandwidth part. For example, base station 110 may determine a switching time between central frequencies for UE 120 based at least in part on a capability of UE 120. In this case, a gap may be configured between downlink resources and uplink resources that are offset from the downlink resources in terms of central frequency, thereby enabling UE 120 to switch between a first central frequency for the downlink resources and a second central frequency for the uplink resources. For example, UE 120 may receive signaling indicating an amount of time that is to elapse between downlink resources and the uplink resources that are offset from the downlink resources. In this case, UE 120 may use the indicated amount of time for switching between monitoring a central frequency of the downlink and monitoring a central frequency of the uplink. In some aspects, the size of the gap may be based at least in part on a UE capability (e.g., how quickly the UE 120 is capable of switching between monitoring different frequencies) and/or a size of the configured offset (e.g., how large a frequency spread the UE 120 is to traverse to switch between monitoring different frequencies).

In some aspects, UE 120 may use the configured offset to identify a set of resources for an uplink or a downlink. For example, as shown by reference number 515, UE 120 may identify different frequency resources for a downlink and an uplink. In this case, based at least in part on the configured offset, the uplink is offset, in frequency resources, from the downlink by a particular amount of resource elements (REs) or resource blocks (RBs). For example, the particular amount of REs or RBs may define the configured offset (e.g., specify an amount of frequency by which the configured offset establishes the different frequency resources for the downlink and the uplink). Additionally, or alternatively, the uplink may be offset from the downlink by a particular frequency range value. For example, the configured offset may be defined as a particular size frequency range, and the uplink may be offset from the downlink by the particular size frequency range. In some aspects, UE 120 may use an indicated central frequency for the downlink and apply the configured offset to identify another central frequency for the uplink (relative to the downlink).

Alternatively, UE 120 may use the indicated central frequency for the uplink and apply the configured offset to identify another central frequency for the downlink (relative to the uplink). In other words, although some aspects are described herein in terms of an uplink relative to a downlink, it should be understood that aspects described herein may apply to a downlink relative to an uplink, a first sidelink direction relative to a second sidelink direction, or any other type of full-duplex or other bidirectional communications. For example, the configured offset may be a particular quantity of REs that the downlink is to be offset from the uplink or that a first sidelink is to be offset from a second sidelink, among other examples.

In some aspects, UE 120 may receive a first configured offset for an uplink relative to a defined central frequency and a second configured offset for a downlink relative to the defined central frequency. In this case, UE 120 may receive first signaling (e.g., radio resource control (RRC) signaling) identifying the defined central frequency and second signaling (e.g., medium access control (MAC) control element (CE) or downlink control information (DCI) signaling) identifying one or more configured offsets.

In some aspects, UE 120 may use a plurality of configured offset values to identify a plurality of sets of resources for an uplink or a downlink. For example, as shown by reference number 520, UE 120 may determine a first frequency offset (relative to a downlink) for a first subset of uplink resources (e.g., with a first periodicity) and a second frequency offset (relative to a downlink) for a second subset of uplink resources (e.g., with a second periodicity). As a particular example, UE 120 may receive two offset indicators identifying a first offset for 100 RBs frequency offset from the central frequency and a second offset for 150 RBs frequency offset from the central frequency. In this case, UE 120 may use the first offset for two slots and the second offset for three slots. In some aspects, UE 120 may determine the periodicity based at least in part on an explicit indicator (e.g., of the 2 slot periodicity for the first offset and the 3 slot periodicity for the second offset), an additive indicator (e.g., indicating 1 extra slot for the periodicity for the second offset), or a multiplicative indicator (e.g., indicating that the second offset has a periodicity 1.5 times that of the first offset or that the first offset has a periodicity of ⅔ that of the downlink bandwidth), among other examples.

In some aspects, UE 120 may receive an offset value identifying an offset in a size of a bandwidth between a downlink and an uplink. For example, as shown by reference number 525, UE 120 may receive signaling identifying a first size bandwidth for a downlink and an offset identify a second size bandwidth (relative to the first size bandwidth) for an uplink. In this case, the first size bandwidth and the second size bandwidth may be based at least in part on a bandwidth scale, such as an additive scale (e.g., where the offset identifies a quantity of fewer or additional RBs or resource block groups (RBGs) for the uplink relative to the downlink) or a multiplicative scale (e.g., where the offset identifies a multiple of a bandwidth for the downlink that the UE 120 is to use for the uplink, such as an integer multiple for a larger bandwidth or a fractional multiple for a smaller bandwidth), among other examples.

In some aspects, UE 120 may identify a flexible resource (e.g., that may be used for downlink or uplink) for communication on the BWP. For example, UE 120 may use the offset value to identify a flexible resource relative to a reference central frequency and bandwidth. In this case, UE 120 may determine that resources within a bandwidth defined for the downlink or uplink are single directional resource and that other resources not within the bandwidth defined for the downlink or uplink are a guard band or a flexible resource, as shown by reference number 530.

As indicated above, FIG. 5 is provided as an example. Other examples may differ from what is described with respect to FIG. 5.

Figure 6:
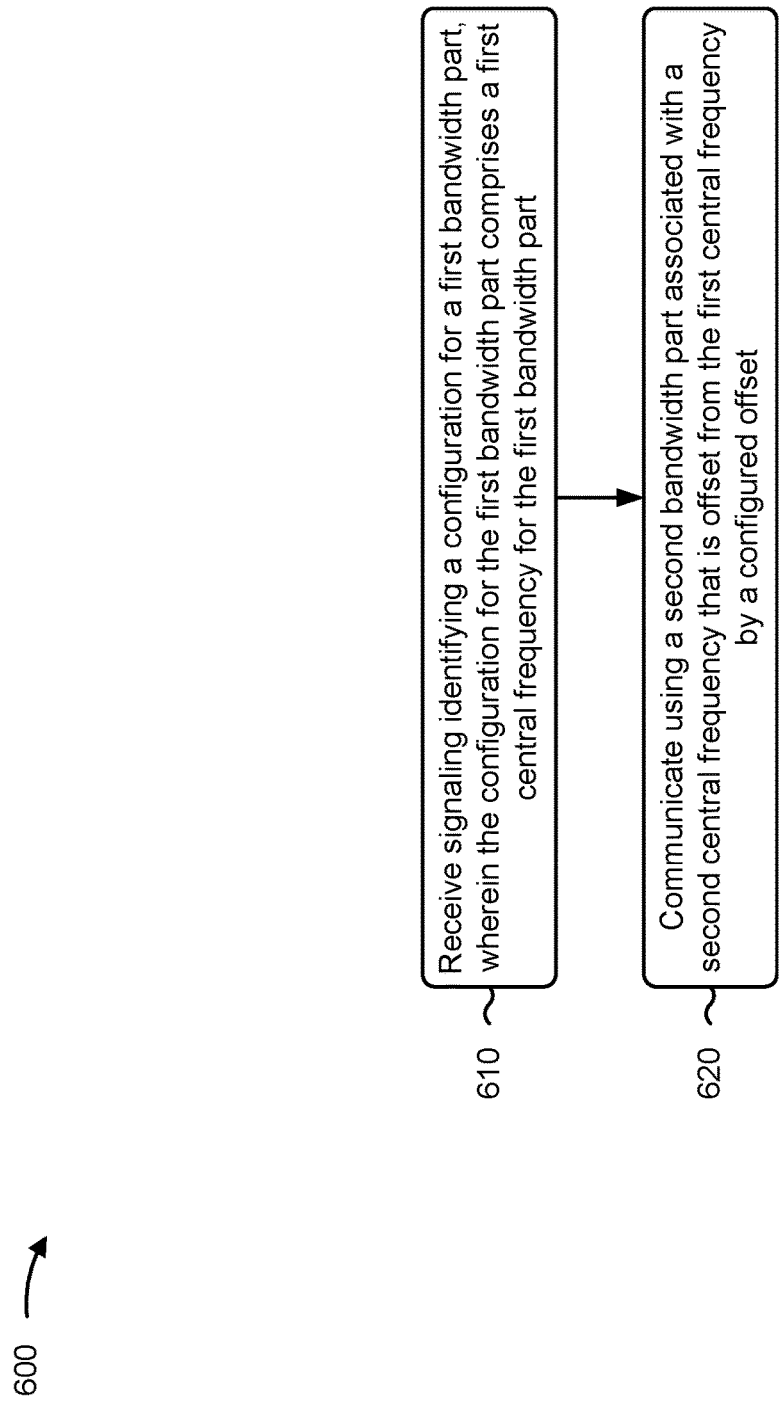
FIGS. 6-7 are diagrams illustrating example processes associated with flexible bandwidth part frequency offset configuration, in accordance with the present disclosure.

FIG. 6 is a diagram illustrating an example process 600 performed, for example, by a network node, in accordance with the present disclosure. Example process 600 is an example where the network node (e.g., UE 120) performs operations associated with flexible bandwidth part frequency offset configuration.

As shown in FIG. 6, in some aspects, process 600 may include receiving signaling identifying a configuration for a first bandwidth part, wherein the configuration for the first bandwidth part comprises a first central frequency for the first bandwidth part (block 610). For example, the network node (e.g., using communication manager 140 and/or reception component 802, depicted in FIG. 8) may receive signaling identifying a configuration for a first bandwidth part, wherein the configuration for the first bandwidth part comprises a first central frequency for the first bandwidth part, as described above.

As further shown in FIG. 6, in some aspects, process 600 may include communicating using a second bandwidth part associated with a second central frequency that is offset from the first central frequency by a configured offset (block 620). For example, the network node (e.g., using communication manager 140 and/or reception component 802 or transmission component 804, depicted in FIG. 8) may communicate using a second bandwidth part associated with a second central frequency that is offset from the first central frequency by a configured offset, as described above.

Process 600 may include additional aspects, such as any single aspect or any combination of aspects described below and/or in connection with one or more other processes described elsewhere herein.

In a first aspect, the first bandwidth part is associated with a first TDD pattern and the second bandwidth part is associated with a second TDD pattern that is different from the first TDD pattern.

In a second aspect, alone or in combination with the first aspect, the first bandwidth part is a downlink resource or an uplink resource.

In a third aspect, alone or in combination with one or more of the first and second aspects, the configured offset is based at least in part on at least one of a quantity of resource blocks, a quantity of resource elements, or a frequency range.

In a fourth aspect, alone or in combination with one or more of the first through third aspects, the first bandwidth part is one of a downlink or uplink resource, and wherein the configured offset is defined for another of the downlink or uplink resource based at least in part on the downlink or uplink resource.

In a fifth aspect, alone or in combination with one or more of the first through fourth aspects, the first central frequency of the first bandwidth part is a reference central frequency associated with radio resource control signaling.

In a sixth aspect, alone or in combination with one or more of the first through fifth aspects, the configured offset is one of a plurality of configured offsets for the second central frequency, and wherein the plurality of configured offsets is associated with a corresponding plurality of periodicities.

In a seventh aspect, alone or in combination with one or more of the first through sixth aspects, the second bandwidth part is configured based at least in part on a bandwidth scale for at least one of a set of uplink resources or a set of downlink resources.

In an eighth aspect, alone or in combination with one or more of the first through seventh aspects, the bandwidth scale is an additive scale associated with a total quantity of resource blocks or resource block groups, or a multiplicative scale associated with a reference bandwidth, a bandwidth of a downlink, or a bandwidth of an uplink.

In a ninth aspect, alone or in combination with one or more of the first through eighth aspects, the first bandwidth part or the second bandwidth part is associated with a plurality of periodicities.

In a tenth aspect, alone or in combination with one or more of the first through ninth aspects, at least one flexible resource is based at least in part on at least one of the configured offset, a bandwidth of the first bandwidth part, or a bandwidth of the second bandwidth part, wherein the at least one flexible resource is usable for downlink reception or uplink transmission.

In an eleventh aspect, alone or in combination with one or more of the first through tenth aspects, a resource for a guard band is based at least in part on at least one of the configured offset, a bandwidth of the first bandwidth part, or a bandwidth of the second bandwidth part.

In a twelfth aspect, alone or in combination with one or more of the first through eleventh aspects, a flexible resource is based at least in part on a reference central frequency or a bandwidth of the second bandwidth part.

In a thirteenth aspect, alone or in combination with one or more of the first through twelfth aspects, a gap is associated with receiving the signaling and communicating using the second bandwidth part.

In a fourteenth aspect, alone or in combination with one or more of the first through thirteenth aspects, wherein process 600 further includes receiving an indication of a size of the gap, wherein the signaling includes the indication of the size of the gap or different signaling includes the indication of the size of the gap.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
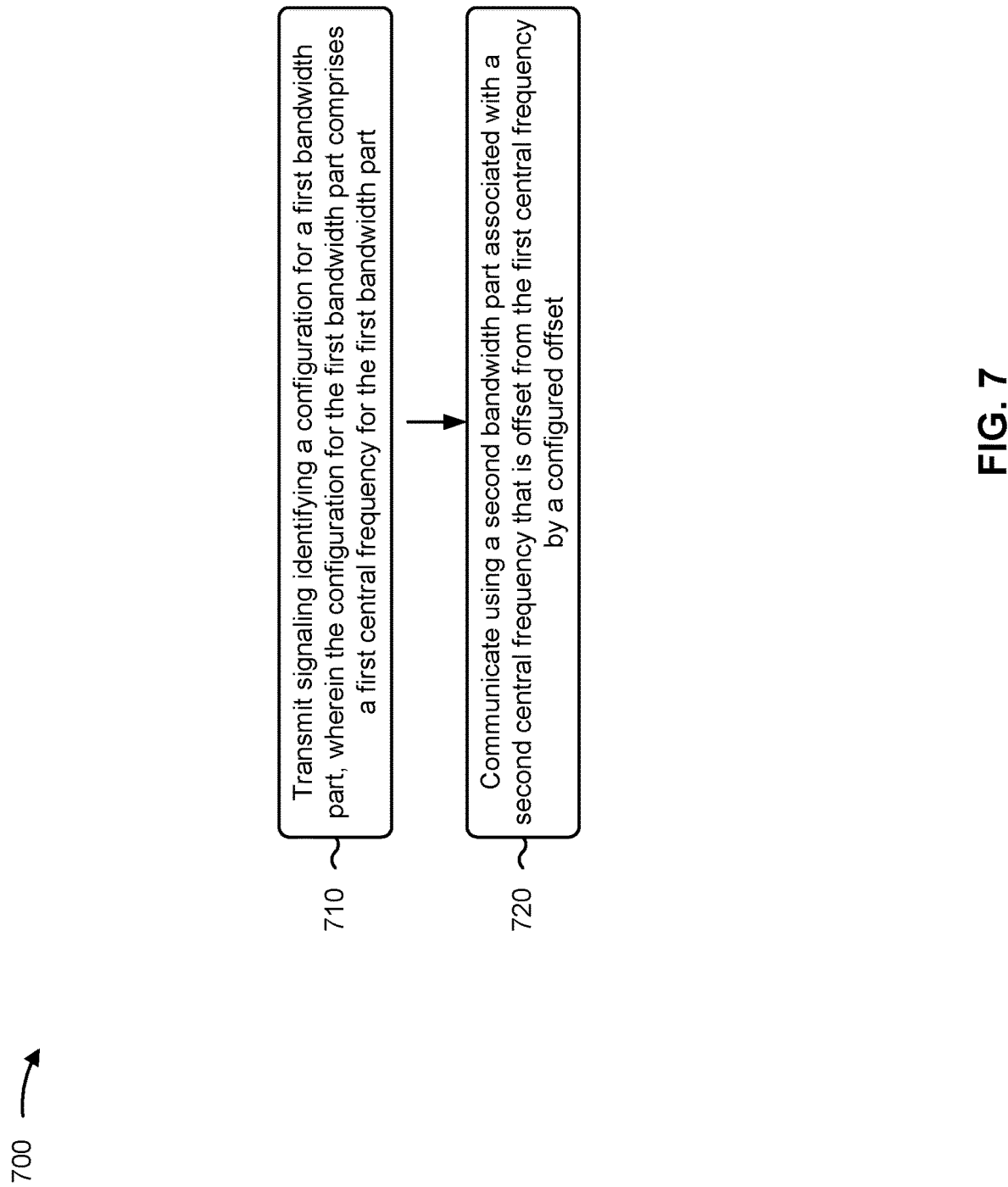

FIG. 7 is a diagram illustrating an example process 700 performed, for example, by a network node, in accordance with the present disclosure. Example process 700 is an example where the network node (e.g., base station 110) performs operations associated with flexible bandwidth part frequency offset configuration.

As shown in FIG. 7, in some aspects, process 700 may include transmitting signaling identifying a configuration for a first bandwidth part, wherein the configuration for the first bandwidth part comprises a first central frequency for the first bandwidth part (block 710). For example, the network node (e.g., using communication manager 150 and/or transmission component 904, depicted in FIG. 9) may transmit signaling identifying a configuration for a first bandwidth part, wherein the configuration for the first bandwidth part comprises a first central frequency for the first bandwidth part, as described above.

As further shown in FIG. 7, in some aspects, process 700 may include communicating using a second bandwidth part associated with a second central frequency that is offset from the first central frequency by a configured offset (block 720). For example, the network node (e.g., using communication manager 150 and/or reception component 902 or transmission component 904, depicted in FIG. 9) may communicate using a second bandwidth part associated with a second central frequency that is offset from the first central frequency by a configured offset, as described above.

Process 700 may include additional aspects, such as any single aspect or any combination of aspects described below and/or in connection with one or more other processes described elsewhere herein.

In a first aspect, the first bandwidth part is associated with a first TDD pattern and the second bandwidth part is associated with a second TDD pattern that is different from the first TDD pattern.

In a second aspect, alone or in combination with the first aspect, the first bandwidth part is a downlink resource or an uplink resource.

In a third aspect, alone or in combination with one or more of the first and second aspects, the configured offset is based at least in part on at least one of a quantity of resource blocks, a quantity of resource elements, or a frequency range.

In a fourth aspect, alone or in combination with one or more of the first through third aspects, the first bandwidth part is one of a downlink or uplink resource, and wherein the configured offset is defined for another of the downlink or uplink resource based at least in part on the downlink or uplink resource.

In a fifth aspect, alone or in combination with one or more of the first through fourth aspects, the first central frequency of the first bandwidth part is a reference central frequency associated with radio resource control signaling.

In a sixth aspect, alone or in combination with one or more of the first through fifth aspects, the configured offset is one of a plurality of configured offsets for the second central frequency, wherein the plurality of configured offsets is associated with a corresponding plurality of periodicities.

In a seventh aspect, alone or in combination with one or more of the first through sixth aspects, the second bandwidth part is configured based at least in part on a bandwidth scale for at least one of a set of uplink resources or a set of downlink resources.

In an eighth aspect, alone or in combination with one or more of the first through seventh aspects, the bandwidth scale is an additive scale associated with a total quantity of resource blocks or resource block groups, or a multiplicative scale associated with a reference bandwidth, a bandwidth of a downlink, or a bandwidth of an uplink.

In a ninth aspect, alone or in combination with one or more of the first through eighth aspects, the first bandwidth part or the second bandwidth part is associated with a plurality of periodicities.

In a tenth aspect, alone or in combination with one or more of the first through ninth aspects, at least one flexible resource is based at least in part on at least one of the configured offset, a bandwidth of the first bandwidth part, or a bandwidth of the second bandwidth part, and wherein the at least one flexible resource is usable for downlink transmission or uplink reception.

In an eleventh aspect, alone or in combination with one or more of the first through tenth aspects, a resource for a guard band is based at least in part on at least one of the configured offset, a bandwidth of the first bandwidth part, or a bandwidth of the second bandwidth part.

In a twelfth aspect, alone or in combination with one or more of the first through eleventh aspects, a flexible resource is based at least in part on a reference central frequency or a bandwidth of the second bandwidth part.

In a thirteenth aspect, alone or in combination with one or more of the first through twelfth aspects, a gap is associated with a network node receiving the signaling and communicating using the second bandwidth part.

In a fourteenth aspect, alone or in combination with one or more of the first through thirteenth aspects, wherein process 700 further includes transmitting an indication of a size of the gap, wherein the signaling includes the indication of the size of the gap or different signaling includes the indication of the size of the gap.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
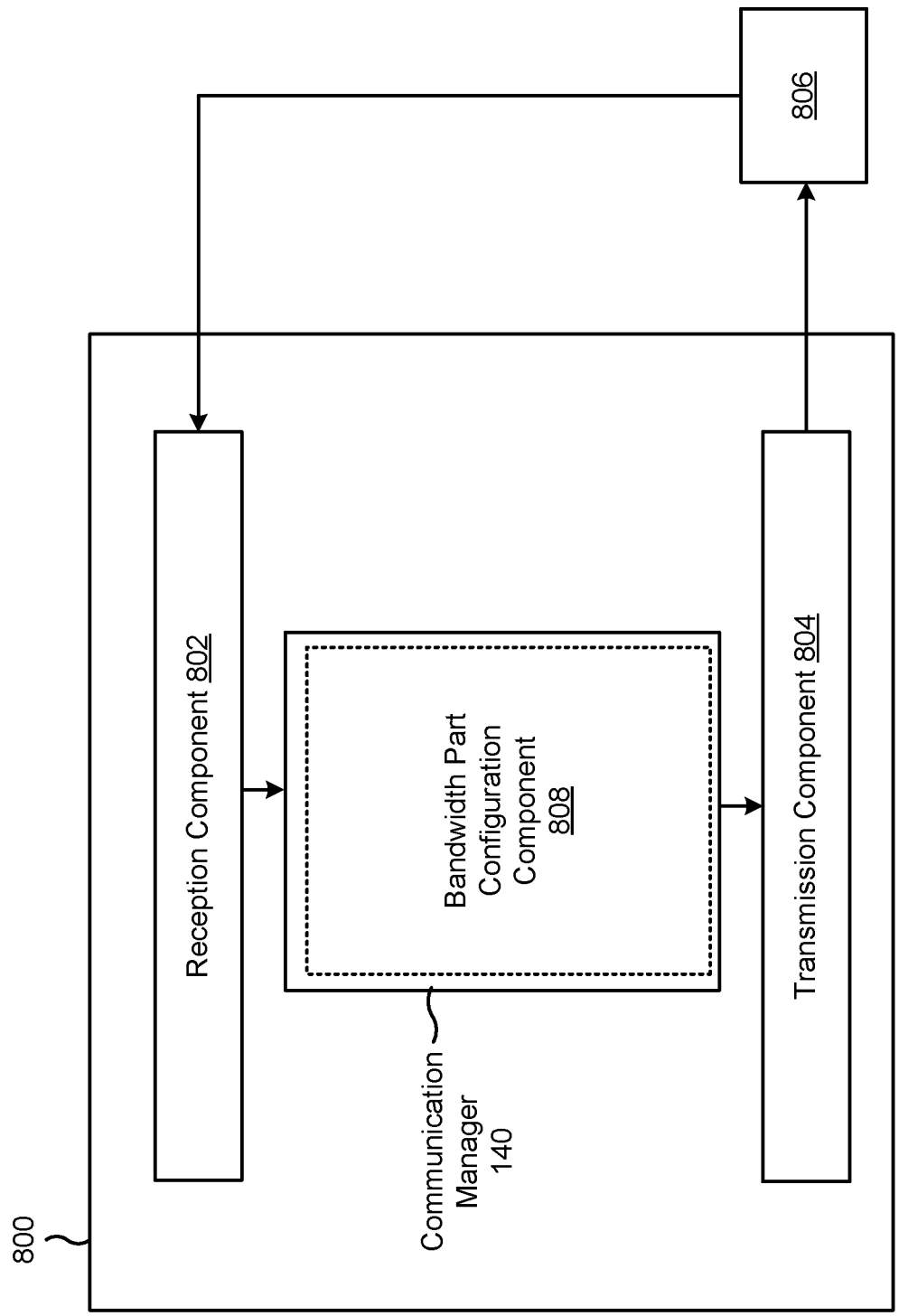
FIGS. 8-9 are diagrams of example apparatuses for wireless communication, in accordance with the present disclosure.

FIG. 8 is a diagram of an example apparatus 800 for wireless communication. The apparatus 800 may be a UE (e.g., a network node), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a bandwidth part configuration component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6 or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive signaling identifying a configuration for a first bandwidth part, wherein the configuration for the first bandwidth part comprises a first central frequency for the first bandwidth part. The reception component 802 or the transmission component 804 may communicate using a second bandwidth part associated with a second central frequency that is offset from the first central frequency by a configured offset. The bandwidth part configuration component 808 may configure a downlink bandwidth part and/or an uplink bandwidth part based at least in part on a received offset indicator, a central frequency indicator, and/or a bandwidth indicator.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
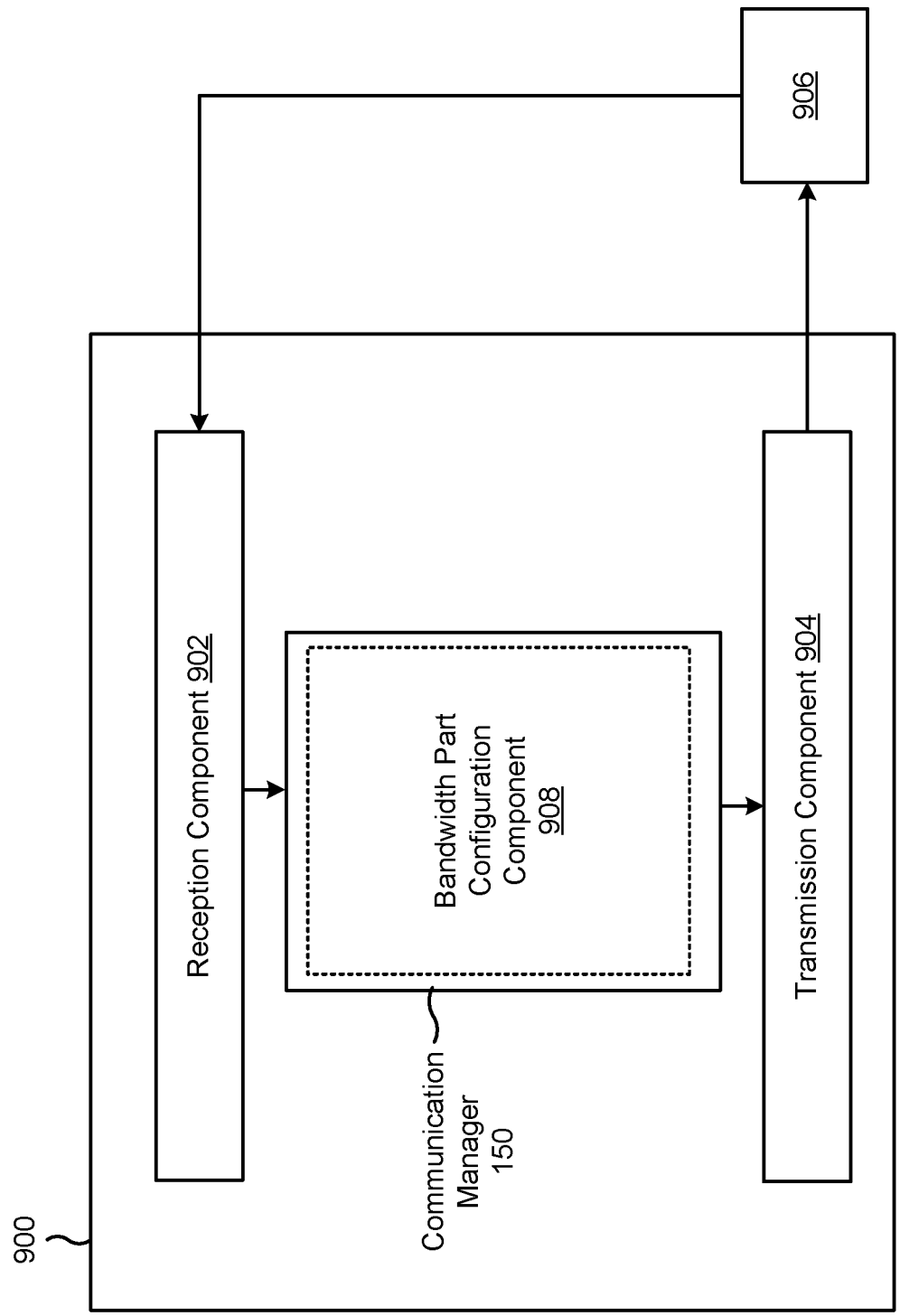

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a bandwidth part configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit signaling identifying a configuration for a first bandwidth part, wherein the configuration for the first bandwidth part comprises a first central frequency for the first bandwidth part. The reception component 902 and/or the transmission component 904 may communicate using a second bandwidth part associated with a second central frequency that is offset from the first central frequency by a configured offset. The bandwidth part configuration component 908 may configure a bandwidth part for the apparatus 906 by configuring an offset for one of a downlink or an uplink from a central frequency of the other of the downlink or the uplink.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a network node, comprising: receiving, by the network node, signaling identifying a configuration for a first bandwidth part, wherein the configuration for the first bandwidth part comprises a first central frequency for the first bandwidth part; and communicating, by the network node, using a second bandwidth part associated with a second central frequency that is offset from the first central frequency by a configured offset.

Aspect 2: The method of Aspect 1, wherein the first bandwidth part is associated with a first time division duplexing (TDD) pattern and the second bandwidth part is associated with a second TDD pattern that is different from the first TDD pattern.

Aspect 3: The method of any of Aspects 1 to 2, wherein the first bandwidth part is a downlink resource or an uplink resource.

Aspect 4: The method of any of Aspects 1 to 3, wherein the configured offset is based at least in part on at least one of: a quantity of resource blocks, a quantity of resource elements, or a frequency range.

Aspect 5: The method of any of Aspects 1 to 4, wherein the first bandwidth part is a downlink resource, and wherein the configured offset is for an uplink resource and is based at least in part on the downlink resource; or wherein the first bandwidth part is an uplink resource, and wherein the configured offset is for a downlink resource and is based at least in part on the uplink resource.

Aspect 6: The method of any of Aspects 1 to 5, wherein the first central frequency of the first bandwidth part is a reference central frequency associated with radio resource control signaling.

Aspect 7: The method of any of Aspects 1 to 6, wherein the configured offset is one of a plurality of configured offsets for the second central frequency, and wherein the plurality of configured offsets is associated with a corresponding plurality of periodicities.

Aspect 8: The method of any of Aspects 1 to 7, wherein the second bandwidth part is configured based at least in part on a bandwidth scale for at least one of a set of uplink resources or a set of downlink resources.

Aspect 9: The method of Aspect 8, wherein the bandwidth scale is: an additive scale associated with a total quantity of resource blocks or resource block groups, or a multiplicative scale associated with a reference bandwidth, a bandwidth of a downlink, or a bandwidth of an uplink.

Aspect 10: The method of any of Aspects 1 to 9, wherein the first bandwidth part or the second bandwidth part is associated with a plurality of periodicities.

Aspect 11: The method of any of Aspects 1 to 10, wherein at least one flexible resource is based at least in part on at least one of the configured offset, a bandwidth of the first bandwidth part, or a bandwidth of the second bandwidth part; and wherein the at least one flexible resource is usable for downlink reception or uplink transmission.

Aspect 12: The method of any of Aspects 1 to 11, wherein a resource for a guard band is based at least in part on at least one of the configured offset, a bandwidth of the first bandwidth part, or a bandwidth of the second bandwidth part.

Aspect 13: The method of any of Aspects 1 to 12, wherein a flexible resource is based at least in part on a reference central frequency or a bandwidth of the second bandwidth part.

Aspect 14: The method of any of Aspects 1 to 13, wherein a gap is associated with receiving the signaling and communicating using the second bandwidth part.

Aspect 15: The method of Aspect 14, further comprising receiving an indication of a size of the gap, wherein the signaling includes the indication of the size of the gap or different signaling includes the indication of the size of the gap.

Aspect 16: A method of wireless communication performed by a network node, comprising: transmitting, by the network node, signaling identifying a configuration for a first bandwidth part, wherein the configuration for the first bandwidth part comprises a first central frequency for the first bandwidth part; and communicating, by the network node, using a second bandwidth part associated with a second central frequency that is offset from the first central frequency by a configured offset.

Aspect 17: The method of Aspect 16, wherein the first bandwidth part is associated with a first time division duplexing (TDD) pattern and the second bandwidth part is associated with a second TDD pattern that is different from the first TDD pattern.

Aspect 18: The method of any of Aspects 16 to 17, wherein the first bandwidth part is a downlink resource or an uplink resource.

Aspect 19: The method of any of Aspects 16 to 18, wherein the configured offset is based at least in part on at least one of: a quantity of resource blocks, a quantity of resource elements, or a frequency range.

Aspect 20: The method of any of Aspects 16 to 19, wherein the first bandwidth part is a downlink resource, and wherein the configured offset is for an uplink resource and is based at least in part on the downlink resource; or wherein the first bandwidth part is an uplink resource, and wherein the configured offset is for a downlink resource and is based at least in part on the uplink resource.

Aspect 21: The method of any of Aspects 16 to 20, wherein the first central frequency of the first bandwidth part is a reference central frequency associated with radio resource control signaling.

Aspect 22: The method of any of Aspects 16 to 21, wherein the configured offset is one of a plurality of configured offsets for the second central frequency, and wherein the plurality of configured offsets is associated with a corresponding plurality of periodicities.

Aspect 23: The method of any of Aspects 16 to 22, wherein the second bandwidth part is configured based at least in part on a bandwidth scale for at least one of a set of uplink resources or a set of downlink resources.

Aspect 24: The method of Aspect 23, wherein the bandwidth scale is: an additive scale associated with a total quantity of resource blocks or resource block groups, or a multiplicative scale associated with a reference bandwidth, a bandwidth of a downlink, or a bandwidth of an uplink.

Aspect 25: The method of any of Aspects 16 to 24, wherein the first bandwidth part or the second bandwidth part is associated with a plurality of periodicities.

Aspect 26: The method of any of Aspects 16 to 25, wherein at least one flexible resource is based at least in part on at least one of the configured offset, a bandwidth of the first bandwidth part, or a bandwidth of the second bandwidth part, and wherein the at least one flexible resource permits downlink transmission or uplink reception.

Aspect 27: The method of any of Aspects 16 to 26, wherein a resource for a guard band is based at least in part on at least one of the configured offset, a bandwidth of the first bandwidth part, or a bandwidth of the second bandwidth part.

Aspect 28: The method of any of Aspects 16 to 27, wherein a flexible resource is based at least in part on a reference central frequency or a bandwidth of the second bandwidth part.

Aspect 29: The method of any of Aspects 16 to 28, wherein a gap is associated with a network node receiving the signaling and communicating using the second bandwidth part.

Aspect 30: The method of Aspect 29, further comprising transmitting an indication of a size of the gap, wherein the signaling includes the indication of the size of the gap or different signaling includes the indication of the size of the gap.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art understand that software and hardware can be designed to implement the systems and/or methods based, at least in part, on the description herein.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
 a memory; and
 one or more processors coupled to the memory, wherein the one or more processors are configured to:
  receive signaling identifying a configuration for a first bandwidth part, wherein the configuration for the first bandwidth part comprises a first central frequency for the first bandwidth part; and
  communicate using a second bandwidth part associated with a second central frequency that is offset from the first central frequency by a configured offset, wherein:
   the first bandwidth part is associated with a first time division duplexing (TDD) pattern,
   the second bandwidth part is associated with a second TDD pattern that is different from the first TDD pattern,
   the first TDD pattern is associated with in-band full-duplex (IBFD) operation at the network node, and
   the second TDD pattern is associated with sub-band full-duplex (SBFD) operation at the network node.

2. The network node of claim 1, wherein the first bandwidth part is a downlink resource or an uplink resource.

3. The network node of claim 1, wherein the configured offset is based at least in part on at least one of:
 a quantity of resource blocks,
 a quantity of resource elements, or
 a frequency range.

4. The network node of claim 1, wherein the first bandwidth part is a downlink resource, and wherein the configured offset is for an uplink resource and is based at least in part on the downlink resource.

5. The network node of claim 1, wherein the first bandwidth part is an uplink resource, and wherein the configured offset is for a downlink resource and is based at least in part on the uplink resource.

6. The network node of claim 1, wherein the first central frequency of the first bandwidth part is a reference central frequency associated with radio resource control signaling.

7. The network node of claim 1, wherein the configured offset is one of a plurality of configured offsets for the second central frequency, and wherein the plurality of configured offsets is associated with a corresponding plurality of periodicities.

8. The network node of claim 1, wherein the second bandwidth part is configured based at least in part on a bandwidth scale for at least one of a set of uplink resources or a set of downlink resources.

9. The network node of claim 8, wherein the bandwidth scale is:
 an additive scale associated with a total quantity of resource blocks or resource block groups, or
 a multiplicative scale associated with a reference bandwidth, a bandwidth of a downlink, or a bandwidth of an uplink.

10. The network node of claim 1, wherein the first bandwidth part or the second bandwidth part is associated with a plurality of periodicities.

11. The network node of claim 1, wherein at least one flexible resource is based at least in part on at least one of the configured offset, a bandwidth of the first bandwidth part, or a bandwidth of the second bandwidth part; and
 wherein the at least one flexible resource is usable for downlink reception or uplink transmission.

12. The network node of claim 1, wherein a resource for a guard band is based at least in part on at least one of the configured offset, a bandwidth of the first bandwidth part, or a bandwidth of the second bandwidth part.

13. The network node of claim 1, wherein a flexible resource is based at least in part on a reference central frequency or a bandwidth of the second bandwidth part.

14. The network node of claim 1, wherein a gap is associated with reception of the signaling and communication using the second bandwidth part.

15. The network node of claim 14, wherein the one or more processors are configured to:
 receive an indication of a size of the gap, wherein the signaling includes the indication of the size of the gap or different signaling includes the indication of the size of the gap.

16. A network node for wireless communication, comprising:
 a memory; and
 one or more processors coupled to the memory, wherein the one or more processors are configured to:
  transmit signaling identifying a configuration for a first bandwidth part, wherein the configuration for the first bandwidth part comprises a first central frequency for the first bandwidth part; and
  communicate using a second bandwidth part associated with a second central frequency that is offset from the first central frequency by a configured offset, wherein:
   the first bandwidth part is associated with a first time division duplexing (TDD) pattern,
   the second bandwidth part is associated with a second TDD pattern that is different from the first TDD pattern,
   the first TDD pattern is associated with in-band full-duplex (IBFD) operation at the network node, and
   the second TDD pattern is associated with sub-band full-duplex (SBFD) operation at the network node.

17. The network node of claim 16, wherein the first bandwidth part is a downlink resource or an uplink resource.

18. The network node of claim 16, wherein the configured offset is based at least in part on at least one of:
 a quantity of resource blocks,
 a quantity of resource elements, or
 a frequency range.

19. The network node of claim 16, wherein the first bandwidth part is a downlink resource, and wherein the configured offset is for an uplink resource and is based at least in part on the downlink resource.

20. The network node of claim 16, wherein the first bandwidth part is an uplink resource, and wherein the configured offset is for a downlink resource and is based at least in part on the uplink resource.

21. The network node of claim 16, wherein the first central frequency of the first bandwidth part is a reference central frequency associated with radio resource control signaling.

22. The network node of claim 16, wherein the configured offset is one of a plurality of configured offsets for the second central frequency, and wherein the plurality of configured offsets is associated with a corresponding plurality of periodicities.

23. The network node of claim 16, wherein the second bandwidth part is configured based at least in part on a bandwidth scale for at least one of a set of uplink resources or a set of downlink resources.

24. The network node of claim 23, wherein the bandwidth scale is:
an additive scale associated with a total quantity of resource blocks or resource block groups, or
a multiplicative scale associated with a reference bandwidth, a bandwidth of a downlink, or a bandwidth of an uplink.

25. The network node of claim 16, wherein the first bandwidth part or the second bandwidth part is associated with a plurality of periodicities.

26. The network node of claim 16, wherein at least one flexible resource is based at least in part on at least one of the configured offset, a bandwidth of the first bandwidth part, or a bandwidth of the second bandwidth part; and
wherein the at least one flexible resource is usable for downlink reception or uplink transmission.

27. The network node of claim 16, wherein a resource for a guard band is based at least in part on at least one of the configured offset, a bandwidth of the first bandwidth part, or a bandwidth of the second bandwidth part.

28. The network node of claim 16, wherein a flexible resource is based at least in part on a reference central frequency or a bandwidth of the second bandwidth part.

29. The network node of claim 16, wherein a gap is associated with transmission of the signaling and communication using the second bandwidth part.

30. The network node of claim 29, wherein the one or more processors are configured to:
transmit an indication of a size of the gap, wherein the signaling includes the indication of the size of the gap or different signaling includes the indication of the size of the gap.

* * * * *